March 21, 1939. D. H. GREENWOOD 2,151,098
RETURN FLOW CHECK AND PLUG VALVE
Filed Jan. 30, 1936 2 Sheets-Sheet 1
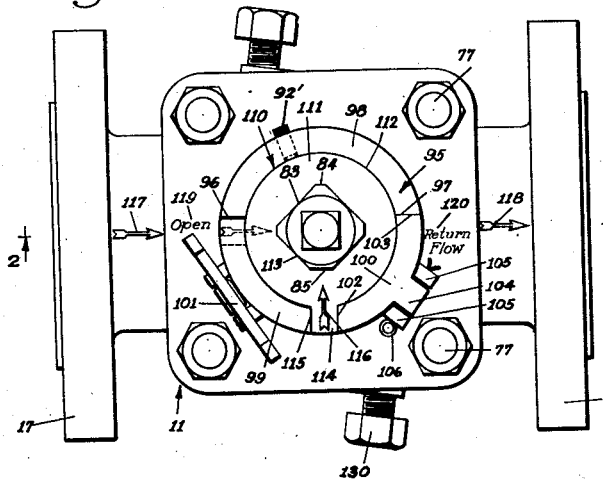
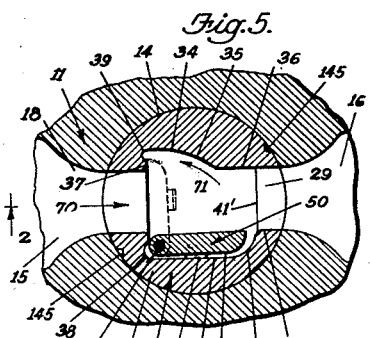
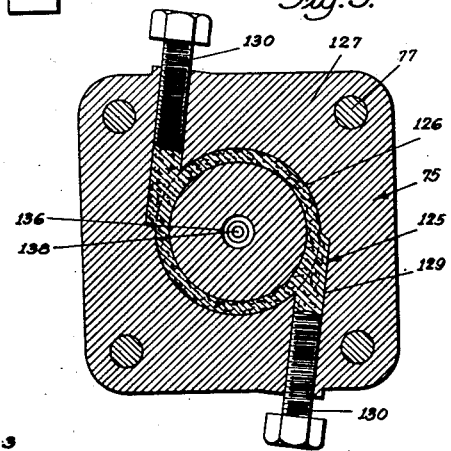
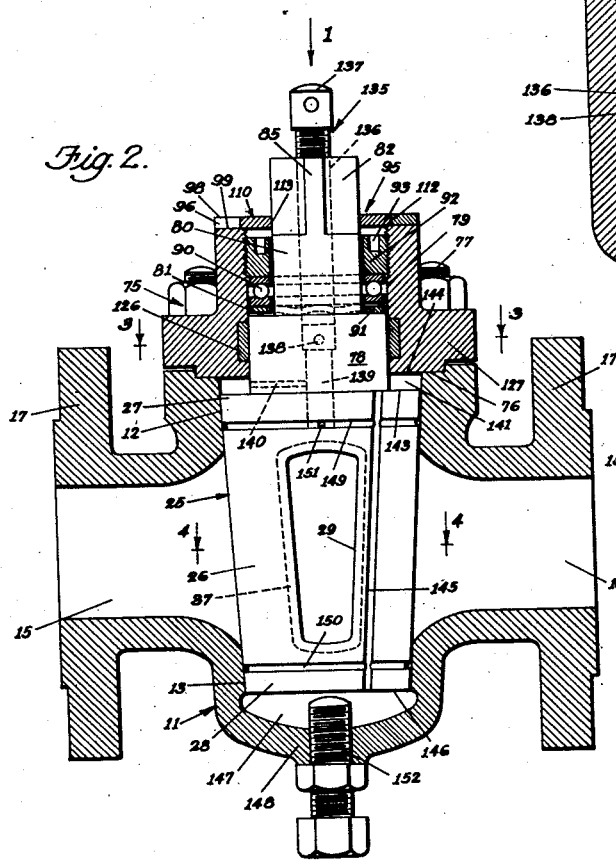
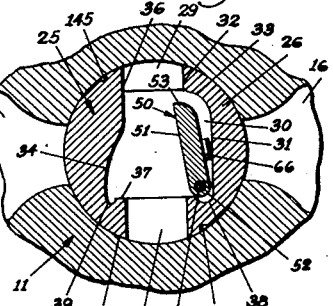
Inventor
D. H. Greenwood
by Hazard and Miller
Attorneys.

March 21, 1939.  D. H. GREENWOOD  2,151,098
RETURN FLOW CHECK AND PLUG VALVE
Filed Jan. 30, 1936  2 Sheets-Sheet 2
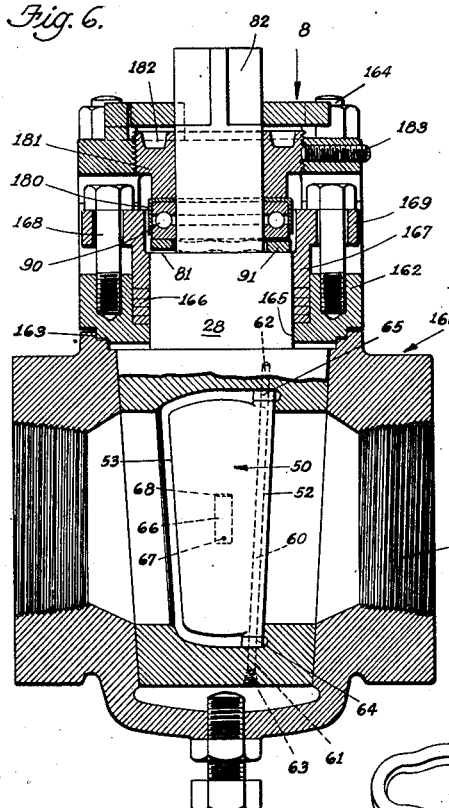
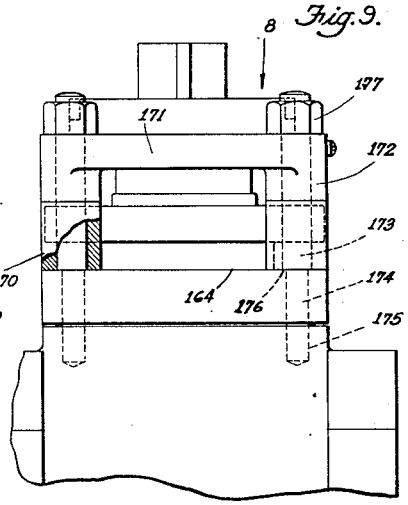
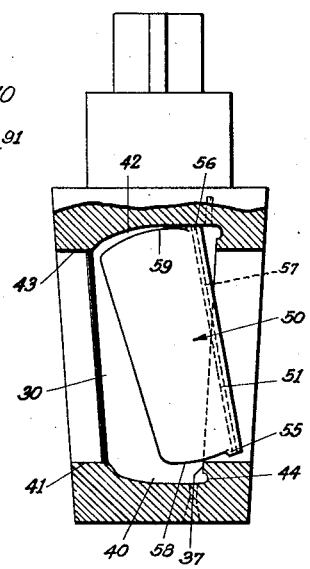
Inventor
D. H. Greenwood
by Hazard and Miller
Attorneys.

Patented Mar. 21, 1939

2,151,098

UNITED STATES PATENT OFFICE 2,151,098

RETURN FLOW CHECK AND PLUG VALVE

Dolphice H. Greenwood, Los Angeles, Calif.

Application January 30, 1936, Serial No. 61,568

8 Claims. (Cl. 277—23)

My invention relates to an improvement in plug valves of the type having a rotatable plug for shutting off and opening the flow of a fluid in which the plug is provided with a check valve.

Another feature of my invention involves a construction by which the plug with the check valve incorporated therein may be reversed and thus provide a check valve operative in the opposite direction.

There are many installations for the flow of liquids and gases in which at present it is necessary to use both a check and shut-off valve. However, with the present type of check valves there is no way of returning liquids or gases through the lines in the reverse direction without first removing the checks in the check valves and either inserting these in an opposite direction or completely reversing the check valves as a whole. This construction also necessitates at least two valves, that is, the shut-off and the check valve in an assembly. With my invention the check valve feature is integrally incorporated with the shut-off valve, when the valve plug is open permitting a flow of liquid or gas in one direction, the check valve, however, being operative immediately to close the valve, that is by forming a closure through the opening in the plug should there be a reverse pressure tending to form a reverse flow of liquid or gas. Also, with my invention a flow in a reverse direction may be readily provided for by turning the plug to operate in a reverse direction so that the check valve may be held open by a reverse flow of the liquid but will be closed if the fluid again reverts to its original direction of pressure or flow.

Another feature of my invention as it relates to the plug having a check valve is that it may be employed with either a circular or a tapering plug fitting in a more or less standard type of valve housing in which the plug is provided with a port extending therethrough, the port being preferably in the line of the diameter. Such port has enlargements on both sides, one of which is of sufficient size to accommodate the flap of the check valve when the check valve is open. Thus defining the valve as if in a vertical installation a pintle forms the pivot for the flap of the check valve and it is located in the largest recess formed at one side of the port through the plug. The other side of the port has a curved recess to allow for the swing of the plug, so that when in its closed position the flap bears against a vertical seat located transverse to the port through the plug of the valve.

Another detail feature of improvement in regard to the check valve relates to the construction of the recesses on opposite sides of the port to permit the check valve flap to be inserted and removed through one end of the port, preferably the end most closely adjacent to the check valve seat. Then when fitted, the flap may be mounted on a pintle inserted more or less in a vertical line.

Another detail characteristic of my invention as to the check valve feature is in providing a spring or the equivalent attached to the back of the flap to engage the rear wall of the recess in which the flap is accommodated when the valve is open, this spring giving an initial outward movement to the flap on release of pressure in the normal direction of flow, so that the flap projects partly into the port of the plug and the pressure of reverse flow causes the closing and seating of the flap on its seat and thus forms an effective check valve closure against reverse pressure or flow, although the plug is turned to its open position.

Another feature of improvement covered by my invention relates to one manner of packing the plug, which consists of providing an annular groove in a valve cap attached to the housing in which cap a cylindrical part of the plug extends, then by means of filler passages arranged in the cap tangential to the annular groove, packing may be pressed and forced by plug screws into the annular recess, thus developing a leakproof packing without the use of the conventional packing gland.

Another feature of my invention relates to the combination of an antifriction bearing such as a ball bearing reacting against the shoulder on the valve plug, including the employment of a spring between the shoulder and the bearing, this being preferably of a marcel type and thus lessening the danger of forcing the bearing too tight against the plug. In addition, with my invention I provide for lubrication of the plug with grease preferably forced through the stem of the plug and thus developing a pressure of grease between the head of the plug and the closure cap of the housing, and also at the opposite end of the plug in a well in the valve housing. With my invention also the side walls of the plug where they bear in the valve housing are lubricated. With my invention the grease is communicated through the stem to the space between the head of the plug and the cap and also by ducts to an upper annular groove in the plug, and then communicated both from the head space and the upper groove by means of longitudinal grooves to the well below the plug and also to a lower annular groove.

My invention is illustrated in connection with the accompanying drawings, in which:

Figure 1 is a plan of one form of the valve taken in the direction of arrow 1 of Figure 2;

Figure 2 is a longitudinal section on the line 2—2 of Figure 1 in the direction of the arrows, the plug however being shown in elevation and in the shut-off position;

Figure 3 is a transverse section on the line 3—3 of Figure 1 taken in the direction of the arrows to illustrate the packing for the plug;

Figure 4 is a horizontal section on the line 4—4 of Figure 2 in the direction of the arrows, illustrating mainly the plug in the shut-off position;

Figure 5 is a section similar to Figure 4 showing the plug in the open valve position;

Figure 6 is a longitudinal section of another form of valve showing, however, a plug similar to that of Figure 2 broken away to illustrate the section;

Figure 7 is an elevation and partial section of a valve plug illustrating the manner of assembling the valve flap;

Figure 8 is a plan view taken in the direction of the arrow 8 of Figure 6 or Figure 9;

Figure 9 is a side elevation taken in the direction of the arrow 9 of Figure 8; and Figure 10 is a perspective view of the Marcel spring.

Considering the general features of the invention, the valve housing 11 has circular upper and lower seats 12 and 13, these being illustrated as tapered to accommodate a taper plug, but manifestly if a cylindrical plug is used, these seating surfaces would be cylindrical. The housing also has marginal seats 14 also formed tapered or cylindrical in accordance with the shape of the plug, merging into the seats 12 and 13. The housing thus has the fluid flowing passages 15 and 16. These passages may be of the usual form, being circular adjacent the flanged ends 17 of the housing. They have a contracted throat adjacent the inner end of each passage indicated at 18, such throat having a larger measurement in a vertical direction than in a horizontal, this being to accommodate the passages to the port in the plug of the valve hereunder detailed. The plug is designated by the assembly numeral 25 in which the plug proper 26 is illustrated as tapered but may be cylindrical to conform to the housing. This plug as to its exterior is circular on the upper end 27 and lower end 28 to have a fit in the circular bearing portions 12 and 13 of the housing. A port 29 extends transversely through the plug, this being preferably of considerable greater vertical height than its transverse width. At one side of the port there is an enlarged recess 30. This has an inner wall surface 31 preferably parallel to the wall 32 defining one side of the port. A curve 33 connects the wall 31 of the recess and the wall 32 of the port. On the opposite side there is a smaller recess 34, this being formed by a curved wall 35 extending from the wall 36 defining the side of the port opposite the side 32. A check valve seat 37 surrounds the port through the plug at the forward end of the recesses, but recess 30 has an undercut portion 38 extending forwardly of the face of the valve seat and the recess 34 has a smaller undercut portion 39 (note particularly Figures 4 and 5). In the bottom of the port there is a bottom recess 40 (note Figure 7) below the lower surface 41 and at the top there is a recess 42 above the top surface 43 of the port 29. Both at the top and bottom there is a forward recess 44 forming an undercut above and below the valve seat 37.

The check valve flap 50 has a flat front face 51 to contact the seat 37. It has a rounded hinged edge 52 and a curved corner on the opposite or free edge 53. The rear face 54 is preferably parallel to the front face 51. Slight bosses 55 and 56 are formed at the bottom and top edge of the flap adjacent the hinged edge 52. A pintle-receiving perforation 57 extends longitudinally through the valve flap adjacent the hinged edge 52 and through bosses 55 and 56. The lower edge 58 is accommodated in the lower recess 40 and the upper edge 59 in the upper recess 42. These recesses 40 and 42 extend into a large side recess 30 and manifestly the recess 34 must extend below and above the surfaces 41 and 43 of the valve port to permit swinging of the valve flap.

The valve flap is preferably assembled or inserted in the plug, as shown in Figure 7. That is, either the upper or lower end is thrust into an upper or lower recess while the plug is held in a position extending longitudinally of the port. A pintle pin 60 is then upwardly fitted through a bore 61 in the portion of the plug below the port and through the perforation 57 in the flap, and the upper end extends into a socket 62 in the portion of the plug above the surface 43 of the port. This hinge or pintle pin preferably has a threaded countersunk head 63 to retain the pin in position, and in order to properly center the valve plug spacing washers or shims 64 and 65 engage respectively the bosses 55 and 56.

A leaf spring 66 is attached to the back of the valve flap at one end indicated at 67 (note Figure 6). The spring extends vertically along the back of the flap and has a natural tendency to have its free upper end 68 spaced from the back of the flap. This spring when the valve flap is open, contacts the surface 31 at the recess 30.

The valve flap functions as a check valve for instance, when the valve is in the open-end position of Figure 5 for flow of fluid in the direction of the arrow 70, the plug being aligned to give free passage through the port of the plug, and the flow of liquid forces the check valve flap into the full line position of Figure 5, the flap thus being accommodated in the large recess 30 at one side of the port. However, if there be a reverse flow of the fluid and thus a reverse pressure, the spring 66 tends to give the flap an initial outward movement, bringing it approximately into the full line position shown in Figure 4, but with the port of the plug in alignment for flow of fluid, that is the valve is in its open position. A pressure is then developed in the back of the flap by the pressure of fluid in the recess 30 and this causes the valve flap to swing into its closed position, the direction of swing being indicated by the arrow 71 of Figure 5. This action turns the check valve flap to the dotted line position of Figure 5 with the face or front surface 51 of the flap having a contact closure with the peripheral seat 37. This forms an effective check valve against the reverse flow of liquid although the plug of the valve has been left in its open position. The arrangement for reversing the valve plug to cause the check valve to operate in a reverse direction utilizes a cap 75 (note particularly Figure 2), which cap rests on the annular shoulder 76 of the main body of the valve housing and is secured thereto by bolts 77. The valve plug 25 as a whole, which has the lower portion designated 26 as the plug proper, is provided with a cylindrical section 78 fitting in the cylindrical bore 79 of the cap. A cylindrical stem 80 extends upwardly from the section 78 and thus forms an annular shoulder 81. A wrench grip head 82 of the plug has flat sides 83 with cut-off corners 84, the corner 85 being cut off to a greater extent than the other corners for the purpose hereinunder detailed. The plug is held in place by an antifriction ball bearing 90, there being a Marcel type of spring 91 bearing on the annular shoulder 81 and an exteriorly threaded nut 92 threaded in the upper part of the bore of the cap 75. This nut has sockets 93 for a spanner wrench.

The upper portion or rim of the cap 75 designated by the assembly numeral 95 has two stop shoulders 96 and 97 with a relatively raised portion 98 therebetween. The other portion of the rim has a depressed surface 99 extending from the shoulders 96 and 97. There are two abutment segments 100 and 101. These each have abutment ends 102 and 103. Each of these segments has a tongue 104 hinged between ears 105 extending outwardly from the wall of the cap 95 and having a pintle pin 106. This allows one or the other of the segmental abutments 100 and 101 to lie flat on the depressed surface 99 of the rim of the cap, or to be tilted upwardly and expose this surface. The stop shoulders 103 of the abutment segments will thus, when the abutments are in the position on the depressed surface 99, contact with the abutment shoulders 97 and 96 respectively and thus make in effect a continuation of the raised portion 98 of the collar.

A reverse stop disk designated by the assembly numeral 110 comprises a disk 111 having a circular periphery 112 fitting in the bore of the cap 75 above the threaded section, and also having a rotational fit inside of the segments 100 and 101 when these lie in a horizontal position on the surface 99. The disk has a center opening 113 which is shaped to conform to the wrench head 82 of the stem of the plug, the corners being cut to correspond to the corners 84 and 85, and also fitting the sides 83. Therefore, on account of the corner 85 of the head being greater than the other corners, the disk 110 can only fit in one position. The disk is provided with a radial stop projection 114 on which there are the opposite and vertical shoulders 115. There is also the pointer arrow 116 to indicate the position of the port of the valve plug. In addition, on the body of the valve there are preferably two arrows 117 and 118 indicating the normal direction of flow of the fluid and also the words indicated at 119 and at 120: "Open" and "Return flow", to indicate the position of the valve.

The manner of thus operating the plug for shut-off and to have the check valve work on a direct flow and also on a reverse flow is as follows: As illustrated in Figure 1, the valve is arranged for a direct flow in the direction of the arrows 117 and 118. However, the plug is shown in the shut-off or closed position with its port transverse to the direction of flow and the radial stop projection 114 contacting the shoulder end 102 of the abutment segment 100 which is in its horizontal position. The segment 101 is illustrated as raised, and thus in an inoperative position. The arrow 116 shows that the valve is closed. To open the valve a plug head 82 is engaged by a wrench or other tool and turned, also rotating the disk 110 until the radial projection 114 engages the fixed shoulder 96 and the raised part of the rim of the cap. This brings the arrow 116 into the dotted line position, pointing in the same direction as the arrows 117 and 118, and as this arrow 116 is adjacent the word "Open" it shows that the valve is open for a direct flow of fluid, and hence the check flow flap will operate to prevent a reverse flow.

When it is desired to flow the fluid in an opposite direction through a pipe and hence through the valve, the abutment segment 100 is tilted upwardly. This allows the disk 110 to be turned until the radial projection 114 engages the fixed stop shoulder 97 of the integral raised part 98 of the rim of the cap. Therefore the arrow 116 would be positioned adjacent the words "Return flow", and point in the reverse direction to the arrows 117 and 118. This will indicate that the plug of the valve with its port is in a position for the flow of fluid in the direction of the arrow 116. Hence the check valve flap has also been reversed and will operate to prevent the flow of fluid in the direction of the arrows 117 and 118. In order to form a stop for the valve plug when operating in this direction, the segment 101 is turned to a horizontal position resting on the surface 99 and one of its ends operates to engage the radial projection 114 and limit the turning of the valve plug to bring such plug into the shut-off position, that is, the same position as shown in Figure 1.

The packing assembly designated generally by the numeral 125 utilizes an annular groove 126 in the flange 127 of the cap 75, which cap is secured to the valve proper by bolts and nuts 77. Tangential passages 129 (note Figure 3) extend from the annular groove to the margins of the flange of the cap and in each of these there is threaded a compressing screw 130. In the action of packing the valve the groove 126 has its exposed inner side adjacent the cylindrical section 78 of the valve plug 25. A suitable type of packing is inserted in the passages 129 and then the pressure screws 130 are threaded inwardly forcing the packing from the passages into the groove 126. As these passages are tangential to the groove the packing is readily forced around the groove. It is preferable to have two passages so that the packing can be forced into the groove from opposite sides. The operation may be repeated until a sufficient amount of packing is fed into the groove to prevent leakage of the lubricating grease or the fluid transmitted.

The lubricating assembly is designated by the numeral 135 (note particularly Figures 1, 2 and 3). The stem of the valve is provided with an axial grease duct 136. This passes through the head 82, the cylindrical portion of the stem 80, and the lower cylindrical section 78. A grease receiving nipple or plug 137 is threaded into the upper end of the grease duct, this being used for connection to a grease gun or grease pressure device. If desired, however, when stiff grease is used a threaded plug may be used to force the grease to the valve. A check valve assembly 138 is located at the lower end of the duct 136 and below this valve there is a lower vertical duct 139. A lateral or radial grease duct 140 communicates from the lower duct 139 to the annular space 141 between the upper circular seat 12 and the valve housing 11, the upper surface 143 of the top of the plug portion 26 of the plug 25 and the lower surface 144 of the cap 75. This construction allows grease to fill the annular space 141. The plug portion 26 of the valve is provided with two longitudinal grease grooves 145 which extend from the upper surface 143 to the lower end 146 of the plug and below which is the well 147 of the valve housing, this having a lower projection 148. An upper annular groove 149 surrounds the plug at the upper seat 12 and a lower annular groove 150 surrounds the plug at the lower seat 15. One or more radial grease ducts 151 communicate from the lower duct 139 to the upper annular groove 149. This supplies grease to this groove 149. The grease from the annular space 144 and also the grease from the groove 149 passes downwardly through the longitudinal grooves 145 to the well 147, spreading in the lower groove 150. A high pressure may be developed in the grease to keep the valve continually lubricated. Should it be desired to unseat the plug, this may be done by the bolt 152 threaded through the lower projection 148 of the valve housing.

One of the functions of the Marcel type of spring 91 below the antifriction bearing 90 is the allowance of a release of grease should there be an excess pressure. On account of the area of the lower end 146 of the valve plug being greater than the exposed flat annular surface 143 at the annular space 144 the tendency of the grease when at high pressure is to unseat the valve. Should this grease pressure become excessive, the Marcel spring 91 permits a slight upward movement of the valve plug a sufficient amount to release some of the grease from the annular space 144 and from the well 147 into the fluid passages 15 and 16. This prevents possible damage to the valve housing by an excessive pressure of grease. In addition, the Marcel spring 91 functions when the proper grease pressure is developed for lubricating the valve to maintain the valve properly seated. Thus I provide a lubricated shut-off valve in which a plug may be either tapered or cylindrical. The preferred form of Marcel spring designated 91 is shown in Figure 10. This is an annular flat band of metal having a slight waviness and preferably with a split 91'. When this spring is under compression the waves of the spring do not flatten out and the width of the split thus become reduced. It will be apparent, however, that in many cases the spring may be made without the split. In addition, other resilient means may be utilized to engage between the annular shoulder 81 of the cylindrical section 78 of the valve plug and the lower race of the antifriction bearing 90. It will be understod that unless care is used in screwing down the threaded nut 92, an excess pressure might be brought on the ball bearing which would be relieved by the yielding of the Marcel spring 91. It is usual to clamp the nut 92 in its adjusted position by a set screw 92' (note Figure 1). In some types of valves the antifriction bearing may be omitted, in which case the nut 92 would have an integral sleeve extension to engage the spring 91.

In forming the races and cord at the portions of the valve plug back of the check valve seat, it is desirable to form a convex curve at 33 joining the wall surface 31 of the back of the recess with the side of the port of the plug, as shown in cross-sections of Figures 4 and 5. This allows a more free flow of fluid back of the check valve flap in order to quickly swing this to its closed position on a reverse flow. Also, at the bottom recess 40 it is desirable to have a gradual curve merging into the bottom surface 41 of the port, this being indicated at 41' and extending across the bottom of the port 29. This construction forms a relatively large recess 40 at the bottom of the port, which usually is maintained scoured of sediment by fluid passing through the valve when in the open position. However, should sediment deposit in this recess and tend to prevent closure of the check valve flap on a reverse flow of fluid, the scouring action of the fluid flowing in and across this recess will tend to dislodge any sediment and to permit the check valve flap to bear against the check valve seat 31.

The design of valve of Figures 6, 8 and 9 is intended for valves of a larger valve opening, that is, for larger pipes than the valve of Figures 1 and 2. However, the construction of the plug and of the check valve therein is substantially the same as in Figures 1 and 2. In this case the valve housing as a unit is indicated by the numeral 160, having threaded openings 161 illustrated as an alternative manner of coupling pipes to the valve rather than a flanged type as shown in Figures 1 and 2. The cap 162 has a jointed connection 163 with the valve housing. This cap is formed rectangular and has an upper plain surface 164 and a cylindrical bore 165 which fits the cylindrical section 78 of the valve plug. A packing 166 fits in a counterbar between the cylindrical section 78 of the plug and is compressed by a cylindrical packing gland 167, this being bolted down by bolts 168 threaded in the cap 162 through perforations in an extended flange 169 of the gland, which flange is circular, and the peripheral edge has a clearance inside of four tubular spaces 170 which rest on the upper surface 164 on the cap 162 at the four corners and on top of the spacers there is a collar 171, this having hub sections 172 at each corner to permit passage of studs 173, which studs extend through perforations 174 adjacent the corners of the cap and into a threaded socket 175 in the valve housing. The shoulders 176 of the studs in engaging the top surface 164 of the cap 162 retains this in place. The nuts 177 threaded on the upper end of the studs retain the collar 171 and the spacers 170 in position.

The Marcel ring 91 rests on the shoulder 81 of the cylindrical section 78 of the plug, and on top of the Marcel ring there is an antifriction bearing 90. A dust and dirt cover 180 forms a cover for the bearing which is maintained seated by an exteriorly threaded nut 181 which engages the interior threads of the collar 171, this nut having spanner wrench sockets 182. A set screw 183 threaded through the collar retains the nut in its adjusted position.

The device for positioning the plug for direct and reverse flow designated by the assembly numeral 190 (note particularly Figures 6 and 8) utilizes a raised segmental rim 191 extending from the radial shoulders 192 to 193. The remaining portion 194 of the rim is at a lower elevation, and resting on this there is a removable segment 195 held in place by a pin 196 extending through a perforation in the segment and fitting in a perforation 197 in the depressed part of the rim. A reverse stop disk 198 is fitted on the head 82 of the plug, this having one of the corners with a larger platen section so that the disk can be inserted only in one direction. This disk has a radial stop projection 199 with end abutment shoulders 200 and 201 to contact the shoulders 192 or 193 of the raised rim section 190 to position the valve for either a direct flow indicated by the full line arrows 202 on the valve housing, or for a reverse flow reverse to the direction of these arrows. An arrow 203 on the disk and the projection 199 indicates the position of the plug for either a direct or a reverse flow when in shut-off position. For instance, as illustrated in Figures 6 and 8, the flow is in a position for a direct flow, and manifestly the check valve would then work to prevent a reverse flow. When the plug is turned so that the shoulder 200 of the projection 199 contacts the end 204 of the removable segment 195 the plug is turned to its shut-off position as indicated by the transverse position of the arrow 203 illustrated dotted. When it is desired to reverse the plug for a flow of fluid through the valve system in a counterdirection, the segment 195 is removed by first removing the pin 196 and replacing this segment in dotted line position at the other end of the valve housing. Of course, before it can be replaced in this second position the valve must either be turned to its shut-off position or to a position for a counterflow.

An important feature of my invention is that the tapered valve plug may be entirely reversed in position so that the pressure flow of fluid may be from a reverse direction through the valve. To develop this function properly the throat 18 of the passages 15 and 16 of the valve housing are made of exactly the same shape and size where they cut the taper seats 12, 13 and 14 of the housing. Hence as the port 29 through the valve plug has the same size opening and contour at each end to conform to the throats 18 of the housing, the plug may be completely reversed and develop a free flow of liquid without developing erosive eddies of fluid in either direction. Thus the check valve is operative to stop a flow of fluid from opposite directions through the housing depending upon the position of the valve. In order to accurately determine whether or no the valve is completely rotated for a reverse flow of fluid, I employ the reverse stop disk 110 which is fitted on the wrench grip end of the plug, the plug and the disk having an interfitting so that the disk can only be attached to the plug in one position. The stop projection 114 will then be engaged by either of the hinged abutment segments 100 or 101, and the two stop shoulders 96 and 97 with the abutment segments will thus limit the location of the valve plug to assure correct aligning of the port of the plug with the throats of the housing for direct or reverse flow.

As the port 29 in the plug is constructed with downwardly tapered side walls to conform to the taper of the plug and thus give the maximum port opening with approximately equal thicknesses of metal on opposite sides of the plug, the check valve seat thus conforms to the shape of the port 29. Also it will be noted that the valve seat has a slight slope conforming approximately to the taper of the valve plug in the vertical center line through the port 29 at the discharge end of the plug, thus the pintle 60 having somewhat the same slope and conforming also to the straight side edge of the valve seat, the check valve flap may be made sufficiently larger in area than the port to develop a proper seating on the check valve seat. In addition this construction allows the side recess 30 to be made sufficiently large to accommodate the check valve flap and still leave sufficient wall structure in the valve plug.

A relatively important feature of my valve construction from the operating standpoint is that as the valves are usually installed in a pipe line with the axis of the plugs vertical, the valve flap swings on its pivot in substantially a vertical plane and when open is in a vertical plane parallel to the axis of the plug. Thus there is a free flow of fluid through the valve without any chattering action of the check valve flap. This also applies whether the plug is positioned for a direct or reverse flow of fluid through the valve housing.

Various changes may be made in the details of construction without departing from the scope of the invention as defined by the appended claims:

I claim:

1. A valve plug having a peripheral surface adapted to form a sealing with a seat of complementary shape of a valve housing, the peripheral surface being concentric to the axis of the plug, there being a port through the plug intersecting the said peripheral surface and at the intersecting portions at both ends being of the same shape and cross sectional area, there being a first relatively large recess at one side of the port, a smaller recess at the opposite side and an upper and lower recess, the said recesses being defined by integral material of the plug, a check valve assembly including a check valve seat having its face at the said recesses and its inner edge of the same shape and cross sectional area as the end portions of the port, a check valve flap of greater face area than the end portions of the port and having a pintle receiving perforation adjacent one edge, the said check valve flap being adapted to be inserted through one end of the port with one of its ends extending into one of the end recesses, the plug having a threaded bore extending from one of the end recesses and a socket extending from the other end recess into the material of the plug, a pintle having a threaded end fitting in the bore through the pintle receiving perforation of the flap and into the socket, the check valve flap being rotatable on the said pintle to occupy a closed checking position with its face in contact with the check valve seat or when in its open position to seat in the first recess.

2. A valve plug as claimed in claim 1, the second recess being opposite the first recess and having a curvature concentric with the pintle, all of the recesses having curved surfaces remote from the check valve seat merging with the end of the port remote from such seat.

3. A valve plug as claimed in claim 1, all of the recesses being provided with an under-cut portion adjacent the check valve seat thereby providing a slight space when the check valve flap is seated against the seat between the face of the flap and the bottom of the undercut portions of the recesses.

4. A valve comprising in combination a valve housing having a valve seat and intersected by openings therethrough for the flow of fluid, said openings on opposite sides of the seat having throats each of the same shape and cross sectional areas, a valve plug having a peripheral surface concentric to its axis to form a seal with the seat of the housing, there being a port extending through the plug and intersecting its periphery, the portions of the port adjacent the periphery being of the same shape and cross sectional areas as the said throats of the housing, the said port being provided with a first and a second side recess and a lower and an upper recess, a check valve assembly including a check valve seat surrounding one portion of the port, and having its inner edge of the same shape and cross sectional area as the port, a check valve flap of larger face area than the port to engage the seat on all sides of the port, said flap having a pintle receiving perforation adjacent one edge, the plug having a threaded bore extending from one end into the lower recess and a socket extending from the upper recess into the body of the plug, a pintle having a threaded head fitted in the said bore, the pintle receiving perforation and the said socket, the check valve flap thereby being rotatable on its pintle to engage the check valve seat or to be accommodated in the first recess and a stem connected to the plug extending through the side of the housing and having means for rotating the plug whereby the plug may be rotated from a fluid conducting position to a closed position or reversed to have the check valve operate for a reversed flow of fluid through the valve housing.

5. A valve as claimed in claim 4, the valve housing having two substantially opposite fixed abutment stops, means having a stop projection attached to the valve stem which when engaging one of the stop abutment positions the port for a direct flow of fluid and when engaging the other stop abutment positions the port for a reverse flow of fluid, a displaceable stop means connected to the valve housing to be positioned to limit the said stop projection to a quarter turn between one of the fixed stop abutments and the said latter displaceable stop means and thereby limit a movement of the plug from a fluid conducting position to a closed position.

6. A valve having a valve housing with a passage therethrough intersected by a valve seat, a plug mounted on said seat and having a diametrical port with a check valve therein, a stem on the plug, a reverse stop disk mounted on the stem in one position only and having a radial stop projection, a pair of substantially opposite fixed stop abutments on the housing, the stem and plug being rotatable to contact the stop projection with either of the fixed stop abutments and thereby position the plug with its port and check valve for direct or reverse flow of fluid, a pair of abutment segments, a pivot connecting each segment to the housing, whereby each segment may be positioned to engage the stop projection or to be removed out of the path of travel of said projection and whereby the rotation of the stem, the stop disk and plug may be limited to 90 degrees to locate the port in a fluid conducting position or a closed valve position.

7. A valve having a valve housing with a passage therethrough intersected by a valve seat, a plug mounted on said seat and having a diametrical port with a check valve in said port, a stem on the plug with a radial stop projection, the housing having a rim with a raised segment, the remaining portion of the rim being depressed, the raised segmental section therefore having stop shoulders at each end, the stop projection connected to the stem being adapted to engage either of said shoulders to position the plug and its check valve to accommodate the direct or reverse flow of fluid, a removable segment with means to attach same to the depressed portion of the rim whereby one of its ends may engage the radial projection and limit the rotation of the plug to a quarter turn to therefore locate the plug for a fluid conducting or a closed valve position.

8. A valve having a valve housing with a passage therethrough intersected by a valve seat, a plug mounted on said seat and having a diametrical port with a check valve in said port, a stem on the plug, a reverse stop disk mounted on the stem in one position only and having a stop projection, a pair of opposite fixed stop abutments on the housing, equally offset one-half the width of the stop projection on the same side of a diametrical line, the stem and plug being rotatable to bring the stop projection into engagement with either of the fixed stop abutments and thereby position the port for a direct or reverse flow of fluid through the valve housing, a removable segmental means connected to the housing and having an end offset from a radial line at right angles to the diametrical line one-half the width of the stop projection whereby the stop projection with the stem and the plug is limited to a 90 degree rotation between one of the fixed abutments and an end of the segmental means to thereby locate the plug for a fluid conducting position or a closed valve position.

DOLPHICE H. GREENWOOD.